United States Patent [19]

Desjardins et al.

[11] Patent Number: 4,509,621
[45] Date of Patent: Apr. 9, 1985

[54] VARIABLE-LOAD ENERGY ABSORBER AND METHOD FOR MAKING ENERGY ABSORBERS HAVING VARIABLE-LOAD CAPABILITY

[75] Inventors: Stanley P. Desjardins; James C. Warrick, both of Tempe, Ariz.

[73] Assignee: Simula Inc., Tempe, Ariz.

[21] Appl. No.: 407,917

[22] Filed: Aug. 13, 1982

[51] Int. Cl.³ .............................................. F16F 7/12
[52] U.S. Cl. .................................................. 188/372
[58] Field of Search ................ 74/492; 188/371–374; 280/805; 293/133

[56] References Cited

U.S. PATENT DOCUMENTS

| | | | |
|---|---|---|---|
| 3,236,333 | 2/1966 | Mitchell | 188/374 |
| 3,599,757 | 8/1971 | Takamatsu et al. | 188/371 |
| 3,604,285 | 9/1971 | Olsson | 188/371 X |
| 3,938,627 | 2/1976 | Nagazumi | 188/371 |
| 4,333,551 | 6/1982 | Shefrin | 188/372 |

Primary Examiner—Duane A. Reger
Attorney, Agent, or Firm—Edward E. McCullough

[57] ABSTRACT

An inversion tube energy absorber, that absorbs energy by inverting a tube, is made to be capable of infinitely variable loading within a prescribed range by addition of a constricting device surrounding the inverted tube where it emerges from its housing. In this device, spherical balls in contact with the tube can be forced inwardly in radial directions by incline surfaces inside a rotatable ring surrounding the balls. This ring can be rotated as desired by turning a dial that is connected to the ring by a flexible shaft via gear systems.

The invention also includes the method for making a variable-load energy absorber by addition of a device that creates additional force through plastic deformation in a selective manner in the basic device.

6 Claims, 9 Drawing Figures

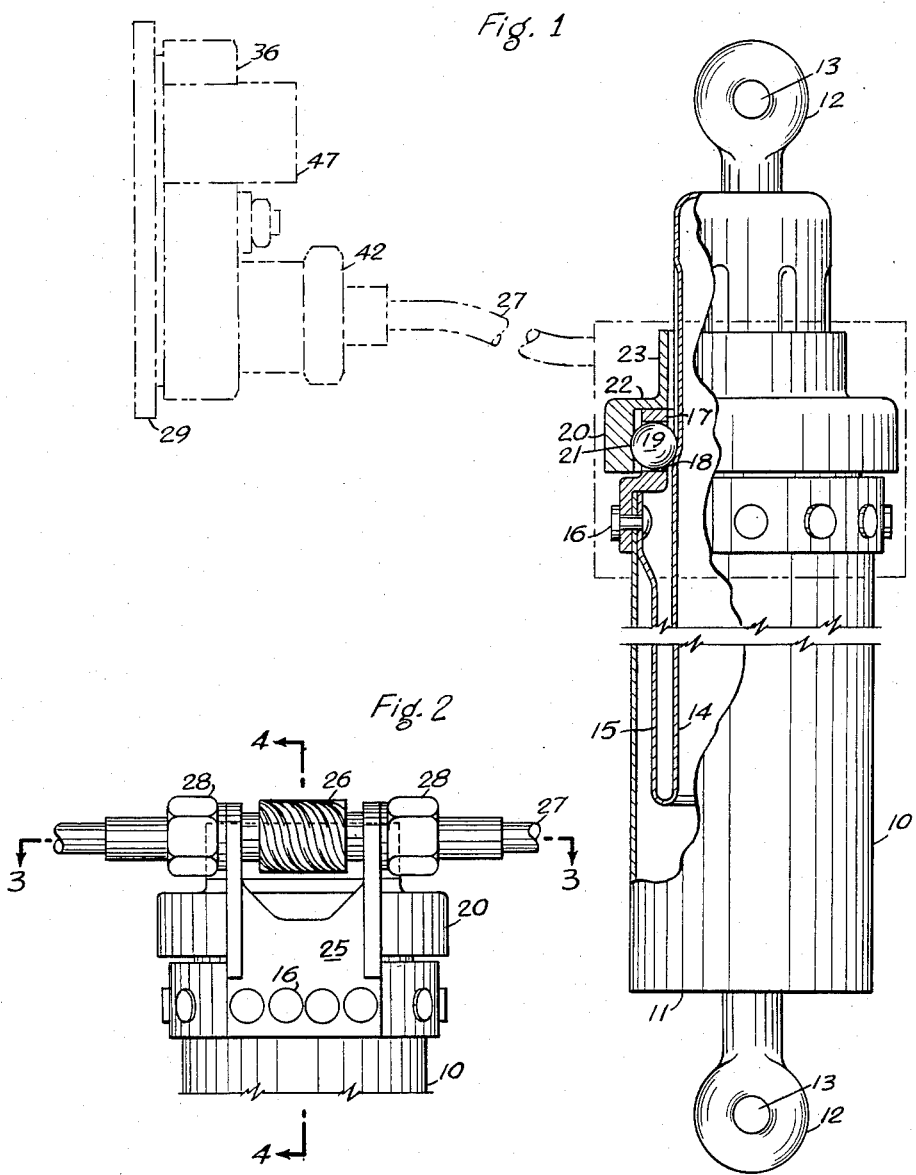

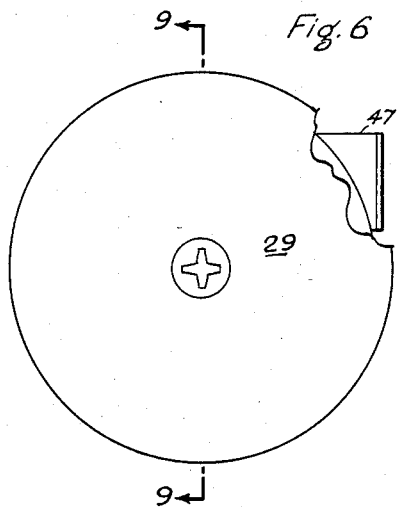
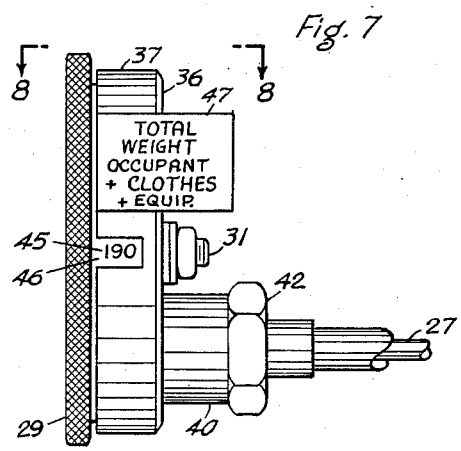
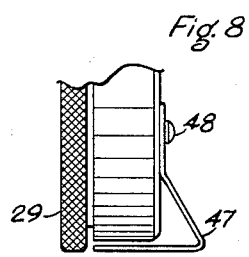
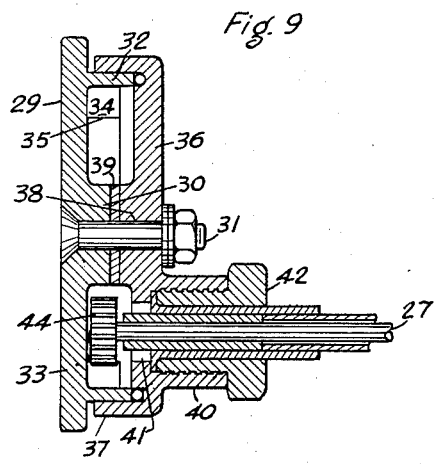

VARIABLE-LOAD ENERGY ABSORBER AND METHOD FOR MAKING ENERGY ABSORBERS HAVING VARIABLE-LOAD CAPABILITY

The Government has rights in this invention pursuant to Contract No. N62269-79-C-0241 awarded by the Department of the Navy.

BACKGROUND OF THE INVENTION

1. Field of the Invention

This invention relates broadly to apparatus for protecting occupants of vehicles in crashes or sudden drops. More specifically, it relates to apparatus that can be adjusted for optimum performance relative to the weight of the individual occupant and his associated equipment, and to a method for making such apparatus.

2. Description of the Prior Art

Because of the relatively low tolerance of the human body to forces parallel to the spine, survivable helicopter accidents, in which sufficient living space is provided by the structure, may impose injurious forces in the vertical direction. Because insufficient crush space is available within the floor structure of helicopters and light aircraft, the seat must play a significant role in attenuating these potentially injurious forces to tolerable levels. Recently developed helicopters such as the U.S. Navy's SH-60B Seahawk, and U.S. Army's UH-60A Black Hawk, and the AH-64A Advanced Attack Helicopter are equipped with seats that have builtin vertical energy-absorption systems.

Presently, fixed energy absorber limit loads are set for the 50th-percentile occupant, under the crash conditions of the 95th-percentile survivable accident. A heavy (e.g. 95th-percentile) occupant in the same crash conditions may bottom out at the end of the stroking distance. Conversely, a lightweight (e.g., 5th-percentile) occupant will not be able to take advantage of the full stroking distance available and will be subjected to accelerations of higher magnitude than desirable.

Prior practice generally has been to build energy absorbers with fixed load capability, with the magnitude of the load set for one particular occupant weight. Occupants of other weights were therefore subjected to energy absorber loads which are not optimized. The only variable-load energy absorber known to the applicants is a device built for CH-47 helicopters. This device utilizes a wire-bending machinism whereby variations in load are achieved by engaging different wires with bending mechanisms. Disadvantages of this device are that the load can be varied in only a few specific increments, and that the system is relatively heavy and bulky.

SUMMARY OF THE INVENTION

The invention is an attachment to a basic energy-absorbing device, that can impart selective energy-absorbing capacity. The invention uses an inversion tube, which is a known device, which is a tube partially turned outside in, such that the inverted tube is reduced in diameter and extends down inside the portion of the tube not yet inverted. The inverted end is closed and equipped with a lug. This tube is fitted into a cylindrical housing, that also has a closed end equipped with a lug. The base of the uninverted portion of the inverted tube is fixed to the unclosed end of the cylindrical housing. Energy is absorbed when the device is pulled apart by the two lugs, further inverting, or turning the inversion tube outside in. According to the present invention, a constricting device surrounds the inverted tube where it emerges from the housing, deforming it radially to the finite extent desired. The inversion tube absorbs the energy of the lightest-weight occupant at tolerable loads, and the constriction device is adjustable for energy absorption at tolerable loads selected for heavier occupants.

Objects of the invention are to provide energy-absorbing devices that are compact, reliable, easy to use, and that can be adjusted to absorb the kinetic energy produced by vehicle occupants of various weights.

Another object of the invention is to provide a method for making energy-absorbing devices having variable-load capability.

Other objects and advantages of the invention will be noted as the following, detailed description is read with reference to the accompanying drawings, wherein the same parts are designated by the same numbers throughout the disclosure.

DESCRIPTION OF THE DRAWINGS

In the drawings:

FIG. 1 is a side elevation of the invention with some parts broken away to show internal structures;

FIG. 2 is a portion of FIG. 1 indicated thereon by phantom lines;

FIG. 6 is a top view of the dial mechanism for adjusting the energy-absorbing capacity of the invention;

FIG. 7 is a side elevation of the invention as shown in FIG. 6;

FIG. 8 is a fragmentary section taken on the line 8—8 of FIG. 7 to show the instruction panel; and FIG. 9 is a sectional view taken on the line 9—9 of FIG. 6.

DESCRIPTION OF THE PREFERRED EMBODIMENTS

Figure 3:
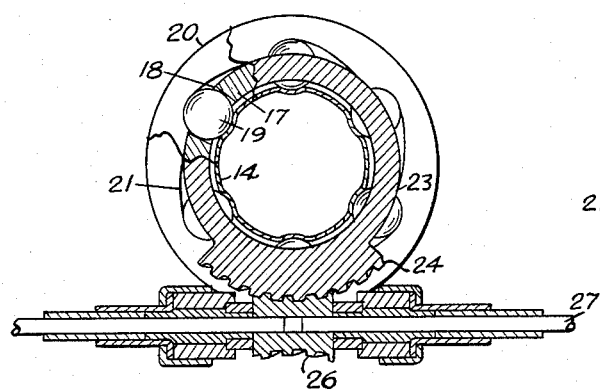
FIG. 3 is a sectional view taken on the line 3—3 of FIG. 2.
Figure 5:
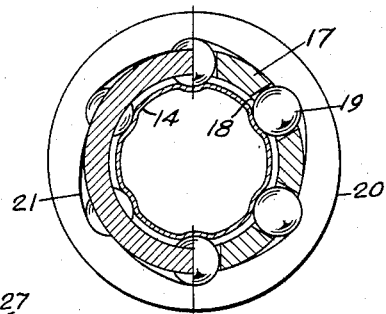
FIG. 5 is a full cross section taken on line 5—5 of FIG. 4.
Figure 4:
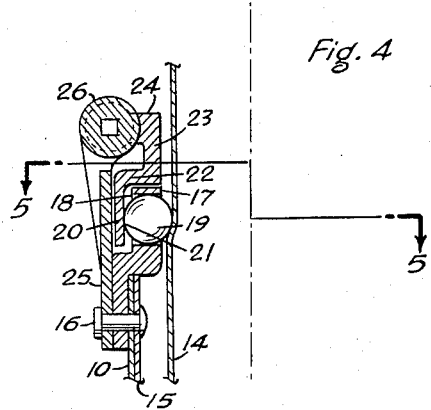
FIG. 4 is a sectional view taken on the line 4—4 of FIG. 2.

As shown in FIG. 1, the inversion tube of the invention has a long, cylindrical housing 10, having a closed end 11, equipped with a lug 12, and having an eye 13. A tube 14, partially turned outside in, as shown, is fitted into the housing 10 so that its uninverted length 15 that surrounds the remainder of the tube 14 parallel thereto is fastened inside the end portion of the housing 10 by rivets 16. These same rivets 16 attach a retaining ring 17 that has equally spaced holes 18 into which spherical balls 19 are seated. As shown in FIG. 4, an adjusting ring 20, surrounding the balls 19, has an internal incline or cam surface 21 for each of the balls 19. The rotational position of the adjusting ring 20 determines how far the incline 21 causes the balls 19 to penetrate into the tube 14. FIGS. 1, 3, and 4 show considerable penetration while FIG. 5, for illustrative purposes, shows the adjusting ring 20 rotated to a position such that the balls 19 are not held into contact with the tube 14. The adjusting ring 20 has an inwardly extending flange on its outer end that fits over the retaining ring 17 and attaches to a smaller diameter sleeve 23 that holds an annular gear 24. On one side of the housing 10 there is an attached bracket 25 that holds a worm screw 26 in engagement with the annular worm gear 24. A flexible shaft 27 passes through the worm screw 26 and is fixed thereto by coupling nuts 28. One end of the flexible shaft 27 extends to the control mechanisms, shown in detail in FIGS. 6–9.

A dial member 29 of the control mechanism has a central boss 30 through which a screw 31 passes. The dial member 29 also is equipped with a short, annular flange 32 at right angles to the disc 33 of the dial member 29 and is somewhat smaller in diameter than the disc 33. Inside the flange 32 is an annular ring gear 34 having internal teeth 35. The control housing 36 is also essentially disc-shaped, and has a peripheral, annular flange 37 at right angles thereto that fits over the flange 32 of the dial member 29. The central screw 31 also passes through a hole 38 in the control housing 36. A plastic washer 39 surrounds the screw 31 between the control housing 36 and the dial member 29. A cylindrical, internally threaded boss 40 extends outwardly at right angles to the disc of the control housing 36 and surrounds a hole 41 in that disc. A hollow, male coupling nut 42 holds the other end of the flexible shaft 27, to which is attached a pinion gear 44. The pinion gear 44 is engaged to the internal teeth 35 of the ring gear 34, so that rotation of the control dial 29 is transmitted, via the flexible shaft 27 to the worm screw 26, which, in turn rotates the outer ring 20 of the constricting apparatus.

The dial member 29 is knurled on its outer periphery to promote ease of manual rotation, and the outer surface of the flange 32 thereof is inscribed with numerals 45 to represent the weights of vehicle occupants, together with their equipment. A window 46 is provided in the flange 37 of the control housing 36 to expose the desired number 45 to which the constriction mechanism has been adjusted. A small bracket 47, bearing instructions, is fastened to the control housing 36 by a rivet 48.

In practice, the invention is typically used in pairs, behind the vehicle seat, each one being attached by a lug 12 to the upper portion of the seat frame and to the seat by the opposite lug 12; so that any sudden jolt of sufficient intensity will cause the inversion tube to be deformed in two ways simultaneously: (1) It deforms in an axial direction by inversion, being turned outside in; and (2) After it is inverted it is deformed radially by the spherical balls 19. In devices of this nature, friction is considered to be a somewhat unpredictable variable, plastic deformation of the material of the inversion tube 14 being much more reliable and predictable in its effects. Hence, it is desirable in a preferred embodiment to coat the inversion tube 14 and cam surface 21 with some surface lubricant, such as Teflon. The inversion tube 14 is typically made of some rigid but ductile material, such as aluminum.

It can be a very simple, standard operational procedure for an occupant of a vehicle, such as a helicopter, to dial his estimated weight plus the weight of any equipment he may be carrying. The flexible shaft 27 to the worm screw 26, engaged to the annular worm gear 24 on the adjusting ring 20, causes the spherical balls 19 to be moved inwardly against the material of the inversion tube 14 by the action of the incline surfaces 21.

The method of making a variable-load energy absorber, as has been described in the foregoing specification, is also considered to be a part of the present invention. According to this method, a basic device (e.g., the inversion tube) that is capable of absorbing energy by being deformed in some way is made adjustable to various loadings by an added device that simultaneously deforms the basic device in some other way. This is accomplished in the present invention by the constriction device comprising the spherical balls 19 that deform the material of the tube 14, deforming it radially at the same time that it is being deformed by being unfolded and subjected to tensile strain. However, the same method can be carried out by various other apparatus. For example, the constricting mechanism could be basically conical similar to a chuck for a drill or lathe, and wherein the clamp members are equipped with rollers that contract the sides of the inversion tube.

An invention has been described that advances the art of energy-absorbing devices. Although the preferred embodiment has been described with considerable specificity regarding detail, it is understood that variations in details do not depart from the scope of the invention as it is described in the following claims.

For example, the housing 10 could be replaced by an annular support or ring sufficiently wide for support of the constriction device and attachment to the inversion tube 15, and equipped with holes or other means for mounting or attaching it to seat structures. The flexible shaft 27 could be eliminated and the control mechanism attached directly to the adjustment ring 20 via gears.

The invention claimed is:

1. A variable-load energy absorber comprising:
an inversion tube, wherein the tube is partially turned outside in, so that the uninverted portion is external to the inverted portion and surrounds and is parallel thereto;
annular support means attached to said external uninverted tube for attaching it to other structures;
means attached to the internal inverted end of the tube for attaching it to other structures; and
means surrounding the tube and attached to said annular support means for constricting the inverted tube to the extent desired.

2. The variable energy absorber of claim 1 wherein the constricting means comprises:
a retaining ring having holes therein, surrounding said tube intermediate to the external uninverted and the end of the internal inverted tube;
spheres retained in the holes in the retaining ring;
a second ring surrounding said retaining ring; and
an incline surface inside said second ring corresponding to each of said spheres, and in contact with the spheres, so that rotation of the second ring will force the spheres inwardly against the inverted tube.

3. The variable-load energy absorber of claim 2, further including means for remotely rotating the second ring.

4. The variable-load energy absorber of claim 3 wherein the means for remotely rotating the second ring comprises:
an annular gear surrounding the tube and fixed to said second ring;
a second gear meshing with said annular gear and being attached, for rotational movement, to the annular support means attached to the external tube;
a flexible shaft attached at one end to the second gear;
a third gear attached to the opposite end of the flexible shaft;
a dial member;
a fourth gear fixed to the dial member;
a housing to retain said third and fourth gears in meshed relationship, whereby rotation of said dial member is transmitted to said second ring via said gears and flexible shaft, causing the second ring to rotate.

5. The variable-load energy absorber of claim 4 wherein said dial member is disc-shaped and said fourth gear is annular, having internal teeth, and is attached to the back side of the dial member.

6. The variable-load energy absorber of claim 5 further including a flange surrounding said fourth gear and inside said housing; numerals on the outside of said flange to indicate weights of seat occupants; and a window in said housing to expose a selected one of said numerals.

* * * * *